April 26, 1966　　　J. G. WALFORD　　　3,248,307
DISTILLATION OF SEA WATER
Filed Nov. 20, 1961　　　2 Sheets-Sheet 1
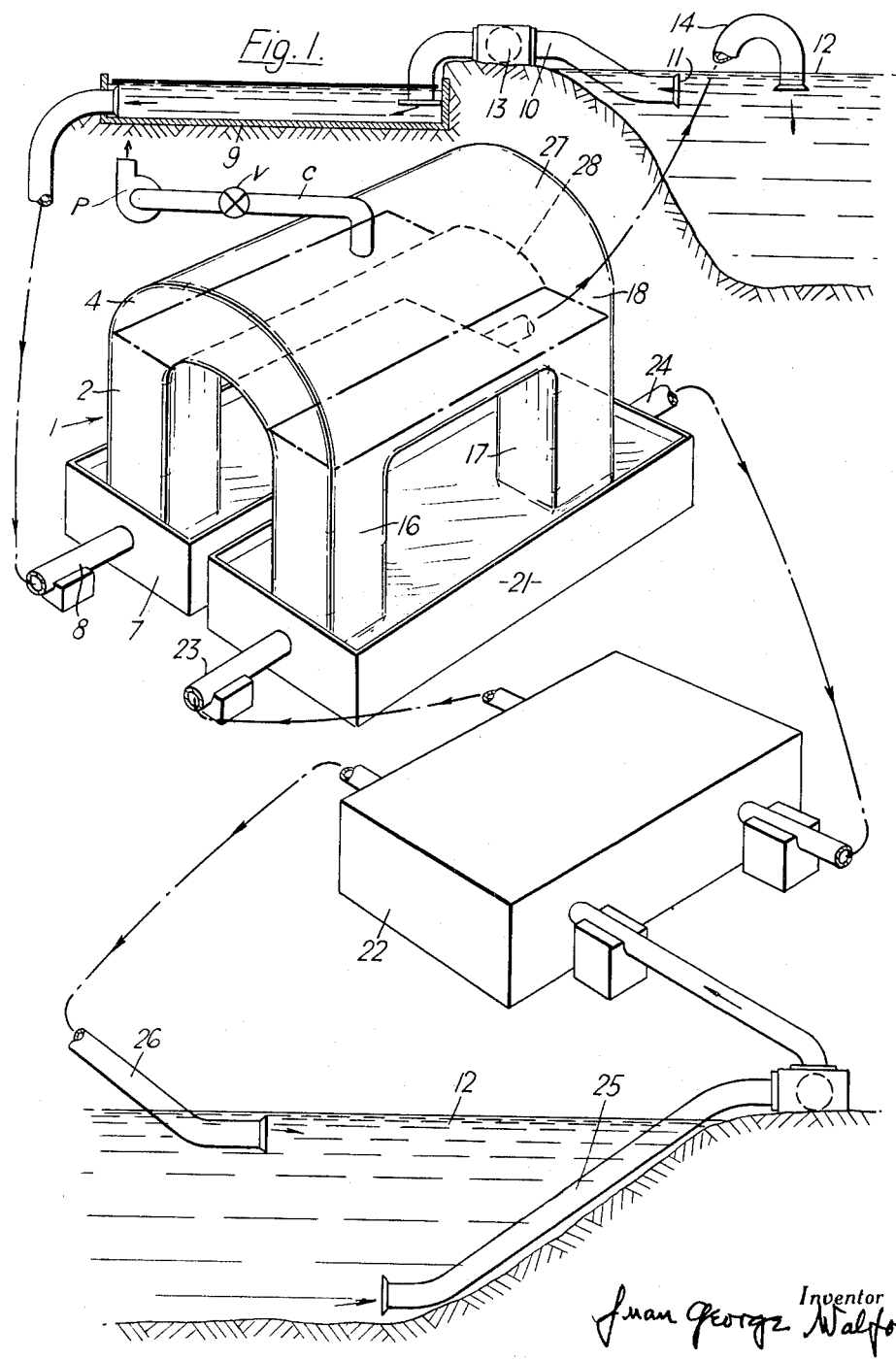

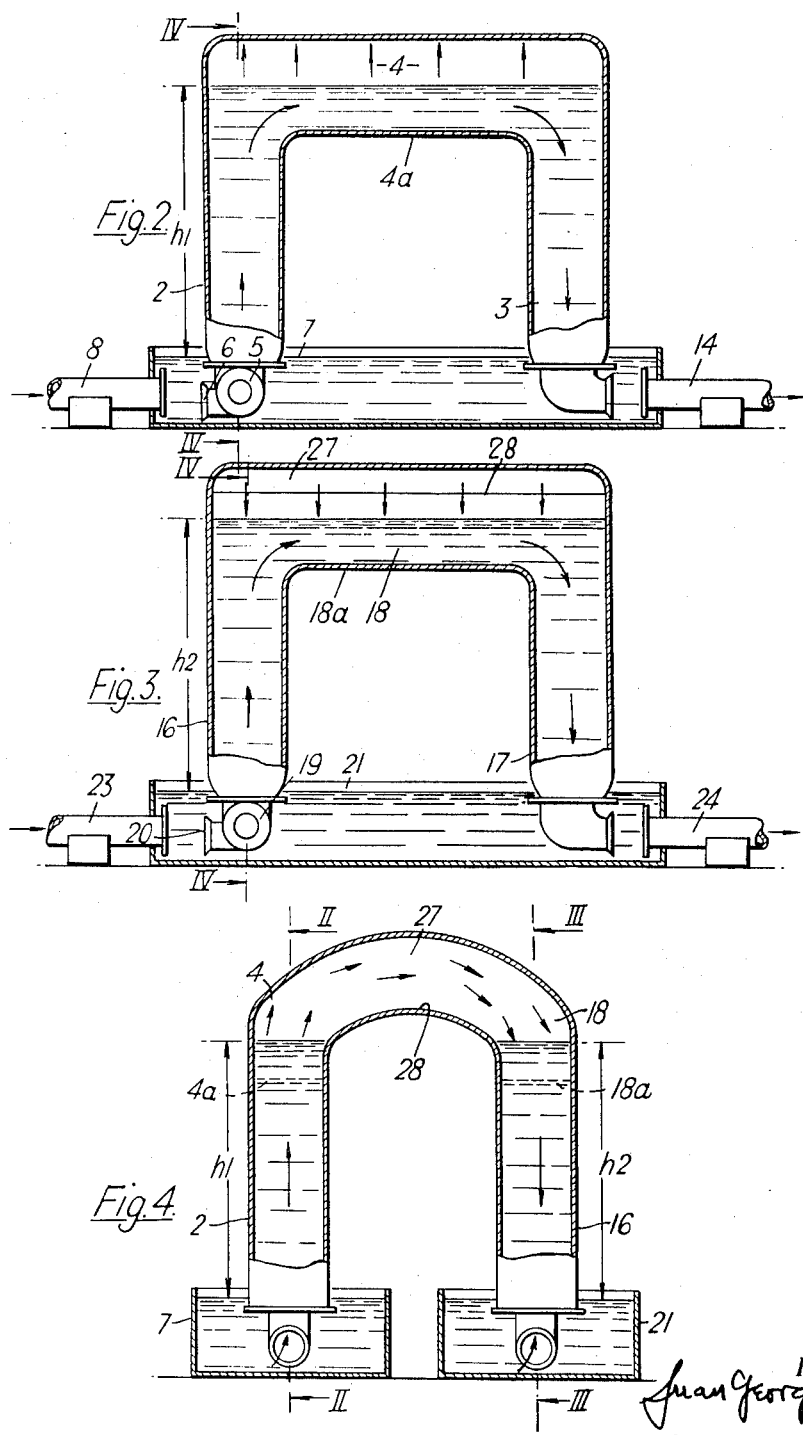

United States Patent Office
3,248,307
Patented Apr. 26, 1966

3,248,307
DISTILLATION OF SEA WATER
Juan George Walford, The Old Rectory, Balcombe, Sussex, England
Filed Nov. 20, 1961, Ser. No. 153,351
Claims priority, application Great Britain, Nov. 23, 1960, 40,326/60
5 Claims. (Cl. 203—11)

This invention relates to a method of and apparatus for distilling sea water, which has been devised so as to make use of quite small differences of temperature such as may exist between the surface and lower layers of water in the sea or in a natural or artificial basin that is heated by the sun.

One of the necessary conditions under which such differences of temperature might be used effectively is that the evaporation must take place under sufficiently reduced pressure to promote rapid evaporation at the temperature reached by the surface layers of the body of sea water. Further, the heat required to evaporate a given quantity of water would have to be extracted from a very much larger quantity of warm surface water. A heat exchanger of inconveniently large dimensions would thus be required.

The present invention overcomes this difficulty by a method of operation in which warm water for supplying heat of evaporation is fed to the evaporator in an upward direction through an inlet column of sufficient height to counterbalance the difference of pressure between the atmosphere and the interior of evaporator and is discharged in a downward direction through an outlet column of the same height. This enables large quantities of warm water to be pumped through the evaporator against a very low resistance because the head of water in the outlet column balances that in the inlet column. The heat of condensation may be extracted from the condenser in a similar manner by feeding cool distilled water from a supply vessel to the condenser in an upward direction and discharging the same water from the condenser back to the supply vessel in a downward direction.

The invention will be fully understood from the following more detailed description by way of example of one practical embodiment of the invention, reference being made to the accompanying drawings in which:

FIGURE 1 is a diagrammatic representation of a complete system;

FIGURE 2 is a sectional view of the evaporator portion of a combined evaporator and condenser forming part of the apparatus shown in FIGURE 1, the section being taken on the line II—II of FIGURE 4;

FIGURE 3 is a sectional view of the condenser portion of the combined evaporator and condenser, the section being taken on the line III—III of FIGURE 4; and FIGURE 4 is a sectional view of the combined evaporator and condenser taken on the line IV—IV of FIGURES 2 and 3.

The heart of the system shown in FIGURE 1 of the drawings is a combined evaporator and condenser indicated generally at 1. The evaporator portion of this structure comprises a tower-like upflow passage 2 and a tower-like downflow passage 3 which communicate at their upper ends with an evaporator chamber 4 in the form of a horizontal channel along which sea water can flow freely from the top end of the upflow passage 2 to the top end of the downflow passage 3. The lower end of the upflow passage 2 communicates with the outlet of a circulating pump 5 having an inlet 6 immersed in a shallow reservoir 7 to which warm sea water drawn from the surface layers of the sea is supplied through a pipe 8. The pipe 8 may take its supply directly from the surface layers of the sea, but in the arrangement shown the sea water is first passed through a warming pan 9 in which the sea water is further heated by the heat of the sun. The warming pan 9 receives water from the sea through a pipe 10 having an inlet 11 arranged to suck in water from the surface of the sea 12. The warm water is continuously supplied to the reservoir 7 by means of a pump 13 and is discharged from the reservoir through an overflow pipe 14 which returns the water to the sea through an outlet 15. The outlet 15 should be disposed at a sufficient distance from the inlet 6 to ensure that the water discharged from the outlet 15 will not return to the inlet 6 at least until it has been effectively re-heated by the sun's rays.

The condenser portion of the combined evaporator and condenser comprises a tower-like upflow passage 16 and a tower-like downflow passage 17 which communicates at their upper ends with a condenser chamber 18 in the form of a horizontal channel along which fresh water can flow freely from the top end of the upflow passage 16 to the top end of the downflow passage 17. The lower end of the upflow passage 16 communicates with the outlet of a circulating pump 19 having an inlet 20 immersed in a shallow reservoir 21 to which cool fresh water obtained from a heat-exchanger 22 is supplied through a pipe 23. The fresh water is continuously circulated from the heat exchanger 22 through the supply pipe 23 to the reservoir 21 and thence through an overflow pipe 24 back to the heat-exchanger 22. The heat-exchanger 22 may be of any known type capable of effecting heat-exchange between the fresh water circulating through the pipes 23 and 24 and a stream of cold sea water circulated through the heat-exchanger by a cold water inlet pipe 25 and a cold water outlet pipe 26, the heat-exchange being effected by conduction of heat through walls which separate the heating fluid from the heated fluid and thus prevent any mixing of the fresh water with sea water. The pipe 25 is arranged to draw water from the sea 12 at a deep level so as to take advantage of the coldness of the water at deep levels to cool the fresh water in the condenser.

The evaporator and condenser chambers 4 and 18 are interconnected by a vapour chamber 27 having an arched floor 28 which separates the salt water in the evaporator chamber 4 from the fresh water in the condenser chamber 18.

To promote rapid evaporation in the evaporator chamber 4 and correspondingly rapid condensation in the condenser chamber 18, the chambers 27 must be evacuated. This may be done by means of a vacuum pump or by displacing the air in the chamber 27 with live steam before starting the system in operation. In FIG. 1 the conduit C is connected at one end to the chamber 27, its other end being connected to the inlet of a vacuum pump P exhausting into the atmosphere, a stop valve V being provided in the conduit C, the arrangement providing means for creating the said vacuum. The water in the evaporator and condenser chambers 4 and 18 will thus find a level determined by the vapour pressure prevailing in the chamber 27. The difference of level between the water in the evaporating chamber and the water in the reservoir 7 is marked $h1$ in FIGURES 1 and 3 and the difference of level between the water in the reservoir 21 and the condenser chamber 18 is marked $h2$ in FIGURES 2 and 3. This difference of level will vary in response to variations in the barometric pressure and will also depend upon the water temperatures and rates of flow in the evaporator and condenser chambers, since these will determine the vapour pressure at which equilibrium will be maintained between evaporation and condensation. The apparatus should be designed to allow for these variations. Thus the height of the arched floor 28 of the vapour chamber 27 above the water levels in the reservoir 7 and 21 should preferably exceed thirty feet so as to ensure that the water level in neither the evaporator chamber or the condenser chamber can rise sufficiently to flow over the floor under any possible conditions. On the other hand the floors 4a and 18a of the evaporator and condenser chambers should be at sufficiently low level to ensure that they will always be flooded even when the barometric pressure is at its lowest and the temperature of the warm sea water fed to the inlet pipe 8 is at its highest. The upper passage 2, evaporator chamber 4 and downflow passage 3 thus form a syphon through which sea water can be pumped against very low resistance. The upflow passage 16, condenser chamber 18 and downflow passage 17 form a similar syphon through which fresh water can be pumped against very low resistance.

It is desirable to ensure turbulence in the water as it flows through the evaporator and condenser chambers. This may be done by inserting helical fins into the evaporator and condenser chambers or by irregularities in the internal surfaces of the chambers.

In the operation of the system, warm sea water is vigorously circulated through the evaporator chamber by means of the circulating pump 5. At the same time cooled sea water is vigorously circulated through the condenser by means of the circulating pump 19. This causes continuous flash evaporation of a fraction of the sea water as it passes through the evaporator and continuous condensation of water vapour in the condenser, equilibrium between evaporation and condensation being maintained by the free flow of water vapour through the vapour chamber 27. The condensate accumulates in the fresh water circulation system and the fresh water supply may be drawn off from the reservoir 21.

The condenser portion of the apparatus need not necessarily be cooled by having cooled fresh water circulated through it as described with reference to the accompanying drawings. Instead, the evaporator may contain cooling tubes through which cold sea water is circulated so that the water condenses on the surfaces of the cold sea water pipes enclosed in the evaporator. In this modified system the condenser chamber may communicate with a reservoir corresponding to the reservoir 21 through two vertical passages like those shown at 16 and 17 in the drawings. However, in this modification the heat exchanger 22 is not required and no provision is needed for circulating water through the reservoir 21. It is therefore not necessary to have more than one vertical passage containing a column of water of sufficient height to balance the difference between pressure prevailing in the interior of the condenser chamber and the pressure acting on the surface of the water in the reservoir 21.

The warming pan 9 provides a means of supplementing the heat available from the surface layers of the sea 12. The solar heating of the water in the pan 9 may be increased by covering the surface of the water with a unimolecular film or a layer of material which prevents evaporation. Instead of or in addition to the warming pan 9, a long delivery pipe may be provided in which incoming sea water is warmed by the sun's rays or by the heat of the surrounding air.

I claim:

1. A method of distilling sea water supplied from a basin subject to atmospheric pressure and containing sea water which is warm relatively to a supply of cooling water obtainable from the sea, which consists in establishing a partial vacuum in a space located at such a height above the level of the sea water in the basin that water raised from said basin to said space by the action of atmospheric pressure finds a level in said space, utilizing the warmth of said relatively warm sea water to promote evaporation in said space by circulating a continuous stream of said warm water upwards through a barometric column to said space and thence through said space and downwards through a second barometric column to a point of discharge, and utilizing said supply of cooling water for condensing the vapour generated in said space and keeping the resultant condensate separate from said sea water.

2. A method of distilling sea water supplied from a basin subject to atmospheric pressure and containing sea water which is warm relatively to a supply of cooling water obtainable from the sea, which consists in establishing a partial vacuum in a space located at such a height above the level of the sea water in the basin that water raised from said basin to said space by the action of atmospheric pressure finds a level in said space determined by the pressure prevailing therein, utilizing the warmth of said relatively warm sea water to promote evaporation in said space by circulating a continuous stream of said warm water from said basin upwards through a barometric column to said space and thence through said space and downwards through a barometric column to a point of discharge, circulating a stream of fresh water through said space keeping the liquid phase of said stream of warm sea separate from the liquid phase of said stream of warm sea water and cooling said fresh water stream by heat exchange with said supply of cooling water.

3. Apparatus for distilling sea water comprising an evaporating chamber containing a liquid channel, a barometric upflow passage having a liquid inlet at its lower end and connected at its upper end to said liquid channel, a barometric downflow passage having a liquid outlet at its lower end and connected at its upper end to said liquid channel, pump means for continuously circulating sea water through said barometric upflow passage, channel and barometric downflow passage, means for withdrawing vapour from said evaporating chamber and condensing said vapour, means for evacuating said evaporating chamber, and a distilled water reservoir communicating with said vapour-withdrawing and condensing means.

4. Apparatus for distilling sea water comprising a combined evaporator and condenser having an evaporator chamber in the form of a liquid channel a condenser chamber in the form of a separate liquid channel, and a vapour space in free communication with both channels, a barometric upflow passage having a liquid inlet at its lower end and connected at its upper end to said evaporator chamber, a barometric downflow passage having a liquid outlet at its lower end and connected at its upper end to said evaporator chamber, pump means for circulating sea water through said barometric upflow passage, evaporator chamber and barometric downflow passage, means for circulating a continuous stream of fresh water through said condenser chamber and heat exchanger means for cooling said fresh water stream.

5. Apparatus for distilling sea water comprising an open reservoir for warm sea water, means for circulating warm sea water through said reservoir, an open fresh water reservoir, heat exchange means for cooling the fresh water in said fresh water reservoir, means for circulating fresh water through said fresh water reservoir and heat exchange means, a combined evaporator and condenser including an evaporator portion containing a horizontal sea water channel and having upflow and downflow passages which communicate at their upper ends with opposite ends of said sea water channel and at their lower ends with said sea water reservoir, said combined evaporator and condensed also including a condenser portion which comprises a horizontal fresh water channel and upflow and downflow passages communicating at their chamber, a barometric downflow passage having a liquid upper ends with said fresh water channel and at their lower ends with said fresh water reservoir, and circulating pump means being provided for circulating sea water through said portion of said chamber and for circulating fresh water through said condenser portion of said chamber.

References Cited by the Examiner

UNITED STATES PATENTS

| | | | |
|---|---|---|---|
| 783,942 | 2/1905 | Forbes | 202—185.2 |
| 948,432 | 2/1910 | Rudeen | 202—185.2 |
| 1,966,938 | 7/1934 | Stone. | |
| 2,006,985 | 7/1935 | Claude et al. | |
| 2,025,724 | 12/1935 | Clendenin. | |
| 2,027,395 | 1/1936 | McVay. | |
| 2,305,408 | 12/1942 | Clemens. | |
| 2,490,659 | 12/1949 | Snyder. | |
| 2,507,632 | 5/1950 | Hickman | 202—185.2 |
| 2,636,129 | 4/1953 | Agnew. | |
| 2,716,446 | 8/1955 | Ross. | |

NORMAN YUDKOFF, *Primary Examiner.*

ALPHONSO SULLIVAN, *Examiner.*

F. E. DRUMMOND, M. H. SILVERSTEIN, W. L. BASCOMB, *Assistant Examiners.*